United States Patent
Kawasato et al.

(10) Patent No.: US 7,709,148 B2
(45) Date of Patent: May 4, 2010

(54) LITHIUM-CONTAINING COMPOSITE OXIDE AND ITS PRODUCTION PROCESS

(75) Inventors: Takeshi Kawasato, Chigasaki (JP); Tokumitsu Kato, Chigasaki (JP); Naoshi Saito, Chigasaki (JP); Koji Tatsumi, Chigasaki (JP); Megumi Uchida, Chigasaki (JP); Remi Hiraki, Chigasaki (JP)

(73) Assignee: AGC Seimi Chemical Co., Ltd., Chigasaki (JP)

( * ) Notice: Subject to any disclaimer, the term of this patent is extended or adjusted under 35 U.S.C. 154(b) by 72 days.

(21) Appl. No.: 11/952,185

(22) Filed: Dec. 7, 2007

(65) Prior Publication Data

US 2008/0131780 A1 Jun. 5, 2008

Related U.S. Application Data

(63) Continuation of application No. PCT/JP2006/321892, filed on Nov. 1, 2006.

(30) Foreign Application Priority Data

Nov. 2, 2005 (JP) .............................. 2005-319899

(51) Int. Cl.
*H01M 4/00* (2006.01)
(52) U.S. Cl. ..................................... 429/223
(58) Field of Classification Search .............. 429/231.1, 429/231.3, 231.95, 209
See application file for complete search history.

(56) References Cited

U.S. PATENT DOCUMENTS

| 5,742,070 | A | | 4/1998 | Hayashi et al. |
| 5,780,181 | A | * | 7/1998 | Idota et al. .................. 429/332 |
| 6,749,965 | B1 | | 6/2004 | Kweon et al. |
| 2006/0154146 | A1 | | 7/2006 | Kawasato et al. |
| 2006/0210879 | A1 | | 9/2006 | Kawasato et al. |
| 2007/0026314 | A1 | | 2/2007 | Kawasato et al. |

FOREIGN PATENT DOCUMENTS

| JP | 3-201368 | | 9/1991 |
| JP | 6-243897 | | 9/1994 |
| JP | 10-72219 | | 3/1998 |
| JP | 10-294100 | * | 4/1998 |
| JP | 10-312805 | | 11/1998 |
| JP | 01-028265 | * | 1/2001 |
| JP | 2001-028265 | | 1/2001 |
| JP | 2002-60225 | | 2/2002 |
| JP | 05-044743 | * | 2/2005 |
| JP | 2005-044743 | | 2/2005 |
| JP | 2005-310744 | | 11/2005 |
| JP | 2006-036545 | | 2/2006 |
| WO | 2005/112152 | | 11/2005 |

* cited by examiner

*Primary Examiner*—Melvin C Mayes
*Assistant Examiner*—Bijay S Saha
(74) *Attorney, Agent, or Firm*—Oblon, Spivak, McClelland, Maier & Neustadt, L.L.P.

(57) ABSTRACT

To provide a process for producing a lithium-containing composite oxide for a positive electrode of a lithium secondary battery, which has a large volume capacity density, high safety, excellent durability for charge and discharge cycles and excellent low temperature characteristics.

14 Claims, No Drawings

LITHIUM-CONTAINING COMPOSITE OXIDE AND ITS PRODUCTION PROCESS

TECHNICAL FIELD

The present invention relates to a process for producing a lithium-containing composite oxide for a positive electrode for a lithium secondary battery, which has a large volume capacity density and high safety and excellent durability for charge and discharge cycles and is excellent in the low temperature characteristics, a positive electrode for a lithium secondary battery containing the produced lithium-containing composite oxide, and a lithium secondary battery.

BACKGROUND ART

Recently, as the portability and cordless tendency of instruments have progressed, a demand for a non-aqueous electrolyte secondary battery such as a lithium secondary battery which is small in size and light in weight and has a high energy density, has been increasingly high. As a cathode active material for the non-aqueous electrolyte secondary battery, a composite oxide of lithium and a transition metal or the like (sometimes referred to as a lithium-containing composite oxide) such as $LiCoO_2$, $LiNi_{1/3}Co_{1/3}Mn_{1/3}O_2$, $LiNiO_2$, $LiNi_{0.8}Co_{0.2}O_2$, $LiMn_2O_4$ or $LiMnO_2$, has been known.

A lithium secondary battery using $LiCoO_2$ among them as a cathode active material and using a lithium alloy or carbon such as graphite or carbon fiber as a negative electrode, can obtain a high voltage at a level of 4V, whereby it has been widely used as a battery having a high energy density.

However, in the case of the non-aqueous type secondary battery using $LiCoO_2$ as a cathode active material, further improvement of the capacity density per unit volume of the positive electrode layer and the safety, has been desired. On the other hand, there has been a problem of deterioration of the cyclic properties such as gradual reduction of the battery discharge capacity due to repetitive charge and discharge cycles, a problem of the weight capacity density or substantial reduction of the discharge capacity at a low temperature.

In order to solve these problems, it has been proposed in Patent Document 1 that the average particle size of $LiCoO_2$ as a cathode active material, be from 3 to 9 µm, the volume occupied by a group of particles having a particle size of from 3 to 15 µm, be at least 75% of the total volume, and the intensity ratio of the diffraction peaks at 2θ=about 19° and 2θ=45° as measured by means of X-ray diffraction analysis using CuKα rays as a radiation source, be of a specific value, so that it becomes an active material excellent in the coating properties, the self-discharge characteristics and the cyclic properties. Further, in Patent Document 1, it has been proposed that the cathode active material is preferably one which does not substantially have such a particle size distribution that the particle size of $LiCoO_2$ is 1 µm or smaller, or 25 µm or larger. With such a cathode active material, the coating properties and the cyclic properties have been improved, but, the safety, the volume capacity density and the weight capacity density, have not yet been fully satisfactory.

Further, in order to solve the problem related to the battery characteristics, Patent Document 2 proposes to replace 5 to 35% of Co atoms with W, Mn, Ta, Ti or Nb to improve the cyclic properties. Further, Patent Document 3 proposes to use hexagonal $LiCoO_2$ as a cathode active material to improve the cyclic properties, wherein the c axis length of the lattice constant is at most 14.051 Å, and the crystal lattice size of (110) direction of the crystal lattice is from 45 to 100 nm.

Further, Patent Document 4 proposes that a lithium-containing composite oxide of the formula $Li_xNi_{1-m}N_mO_2$ (wherein 0<x<1.1, 0≦m≦1), of which the primary particles are plate-like or columnar, the ratio of (volume standard cumulative 95% size−volume standard cumulative 5% size)/(volume standard cumulative 5% size) is at most 3, and further, the average particle size is from 1 to 50 µm, has a high initial discharge capacity per weight and further is excellent in the charge and discharge cyclic durability.

Further, Patent Document 5 proposes to lithiate a cobalt compound powder in the form of secondary particles with an average particle size of 0.5 to 30 µm formed by agglomeration of primary particles of cobalt hydroxide, cobalt oxyhydroxide or cobalt oxide with an average particle size of from 0.01 to 2 µm. However, also in this case, it is not possible to obtain a cathode active material having a high volume capacity density, and further, the material is insufficient also with respect to the cyclic properties, the safety or the large current discharge properties.

As described above, in the prior art, with respect to a lithium secondary battery employing a lithium-containing composite oxide as a cathode active material, it has not yet been possible to obtain one which sufficiently satisfies all of the volume capacity density, the safety, the coating uniformity, the cyclic properties and further the low temperature characteristics.

Patent Document 1: JP-A-6-243897
Patent Document 2: JP-A-3-201368
Patent Document 3: JP-A-10-312805
Patent Document 4: JP-A-10-72219
Patent Document 5: JP-A-2002-60225

DISCLOSURE OF THE INVENTION

Object to be Accomplished by the Invention

It is an object of the present invention to provide a process for producing a lithium-containing composite oxide, which has a large volume capacity density and high safety, and excellent durability for charge and discharge cycles and which is further excellent in the low temperature characteristics, at a low production cost, a positive electrode for a lithium secondary battery containing the produced lithium-containing composite oxide, and a lithium secondary battery containing the produced lithium-containing composite oxide.

Means to Accomplish the Object

The present inventors have conducted extensive studies and as a result, found that the above object is accomplished by the following invention.

(1) A process for producing a lithium-containing composite oxide represented by the formula $Li_pN_xM_yO_zF_a$ (wherein N is at least one element selected from the group consisting of Co, Mn and Ni, M is at least one element selected from the group consisting of Al, alkaline earth metal elements and transition metal elements other than Co, Mn and Ni, 0.9≦p≦1.2, 0.95≦x<2.00, 0<y≦0.05, 1.9≦z≦4.2 and 0≦a≦0.05), by firing a mixture containing a lithium source, an N element source, an M element source, and if necessary, a fluorine source, characterized by comprising step 1 of mixing a lithium source, an N element source, an M element source containing at least Al, and if necessary, a fluorine source, and firing the mixture in an oxygen-containing atmosphere at from 700 to 1,100° C. to obtain a lithium-containing composite oxide powder, and step 2 of mixing the lithium-containing composite oxide powder obtained in step 1, an M element salt aqueous solution containing at least Zr and/or Ti, and if necessary, a fluorine source, and firing the mixture in an oxygen-containing atmosphere at from 300 to 1,100° C., and characterized in that the amount of Zr and/or Ti contained in the obtained lithium-containing composite oxide powder is from 0.1 to 30% (on the basis of weight) of all the M elements.

(2) The process according to Claim 1, wherein in the above step 1, the M element source is an M element source in the form of an aqueous solution of an M element-containing carboxylate containing at least Al, and the M element-containing carboxylate is a carboxylate having at least two carboxyl groups or having at least two carboxyl group(s), hydroxyl group(s) or carbonyl group(s) in total.

(3) The process according to the above (2), wherein the M element-containing carboxylate is a salt of at least one acid selected from the group consisting of citric acid, maleic acid, lactic acid and tartaric acid.

(4) The process according to the above (2) or (3), wherein the M element-containing carboxylate aqueous solution has a pH of from 2 to 12.

(5) The process according to the above (1), wherein the N element source and the M element source in the above step 1 are an N-M element coprecipitate precipitated by adding a pH adjustor and an alkali to an aqueous solution having an M element salt containing at least Al and an N element salt dissolved therein.

(6) The process according to any one of the above (1) to (5), wherein the M element source in step 1 contains at least Al and Mg.

(7) The process according to any one of the above (1) to (6), wherein the Zr and/or Ti concentration in the vicinity of the particle surface is higher than the Zr and/or Ti concentration in the vicinity of the particle center.

(8) The process according to any one of the above (1) to (7), wherein in step 2, the Zr salt aqueous solution as the M element salt aqueous solution is an aqueous solution containing zirconium ammonium carbonate and/or a zirconium ammonium halide.

(9) The process according to any one of the above (1) to (7), wherein in step 2, the Ti salt aqueous solution as the M element salt aqueous solution is an aqueous solution containing titanium lactate.

(10) The process according to any one of the above (1) to (9), wherein in step 2, the M element salt aqueous solution further contains magnesium.

(11) The process according to any one of the above (1) to (10), wherein the N element source is at least one member selected from the group consisting of a nickel salt, a cobalt salt, a nickel-cobalt coprecipitate and a nickel-cobalt-manganese coprecipitate.

(12) The process according to any one of the above (1) to (11), wherein the N element source is at least one member selected from the group consisting of cobalt hydroxide, cobalt oxyhydroxide, tricobalt tetroxide and cobalt carbonate.

(13) The process according to any one of the above (1) to (12), wherein the M element contains Al; Zr and/or Ti; and at least one element selected from the group consisting of Hf, Nb, Ta, Mg, Sn and Zn.

(14) The process according to any one of the above (1) to (13), wherein the M element contains Al, and Zr and/or Ti, in an Al/(Zr and/or Ti) atomic ratio of from 1/2 to 40/1.

(15) A positive electrode for a lithium secondary battery, which is a positive electrode for a non-aqueous electrolyte secondary battery comprising a cathode active material, an electroconductive material and a binder material, wherein the cathode active material contains the lithium-containing composite oxide produced by the process as defined in any one of the above (1) to (14).

(16) A lithium secondary battery which is a non-aqueous electrolyte secondary battery comprising a positive electrode, a negative electrode, a non-aqueous electrolyte and an electrolytic solution, wherein the positive electrode is the positive electrode as defined in the above (15).

(17) A lithium-containing composite oxide for a positive electrode of a non-aqueous electrolyte secondary battery represented by the formula $Li_pN_xM_yO_zF_a$ (wherein N is at least one element selected from the group consisting of Co, Mn and Ni, M is at least one element selected from the group consisting of Al, alkaline earth metal elements and transition metal elements other than Co, Mn and Ni, $0.9 \leq p \leq 1.2$, $0.95 \leq x < 2.00$, $0 < y \leq 0.05$, $1.9 \leq z \leq 4.2$ and $0 \leq a \leq 0.05$), which contains at least (zirconium and magnesium) or (titanium and magnesium) in the vicinity of the surface of particles of the lithium-containing composite oxide.

(18) The lithium-containing composite oxide for a positive electrode of a non-aqueous electrolyte secondary battery according to the above (17), which contains at least a composite compound containing zirconium and magnesium or a composite compound containing titanium and magnesium in the vicinity of the surface of particles of the lithium-containing composite oxide.

(19) A lithium secondary battery which is a non-aqueous electrolyte secondary battery comprising a positive electrode, a negative electrode, a non-aqueous electrolyte and an electrolytic solution, wherein the positive electrode contains the lithium-containing composite oxide as defined in the above (17) or (18).

EFFECTS OF THE INVENTION

According to the present invention, it is possible to provide a process for producing a lithium-containing composite oxide such as a lithium-cobalt composite oxide, which has a large volume capacity density, high safety and excellent durability for charge and discharge cycles and is further excellent in the low temperature characteristics when used as a positive electrode for a lithium secondary battery, a positive electrode for a lithium secondary battery containing the produced lithium-containing composite oxide, and a lithium secondary battery containing the produced lithium-containing composite oxide.

The reason as to why the lithium-containing composite oxide such as a lithium-cobalt composite oxide to be obtained by the production process of the present invention has such excellent properties as a positive electrode for a lithium secondary battery is not necessarily clearly understood, but is considered to be as follows.

A lithium-cobalt composite oxide represented by lithium cobaltate has an unstable structure in a battery charged state i.e. in a state where lithium ions are withdrawn, and when it is heated, it reacts with an organic solvent of an electrolytic solution at the particle interface and is decomposed to lithium cobaltate and cobalt oxide to cause significant heat generation.

When Al, Mg or the like is incorporated in the lithium-cobalt composite oxide, the structural change accompanying entrance and exit of Li is suppressed by some of Co being replaced with Al, Mg or the like, whereby the structure will be stabilized and the safety will improve. However, if such an element is added, the capacity per weight of the active material tends to decrease and further, the density of the powder particles tends to decrease, whereby the capacity per volume tends to decrease.

In step 1 of the present invention, in a case where an M element-containing carboxylate aqueous solution containing at least Al is used as the M element source for the lithium-containing composite oxide represented by $Li_pN_xM_yO_zF_a$, the M element source is reacted with another component element source of the lithium-containing composite oxide, whereby in the obtained lithium-containing composite oxide, the M-element containing at least Al is uniformly present as compared with a conventional solid phase reaction. Similarly, it is considered that the M element is uniformly present also in a case of producing an M-N element coprecipitate by coprecipitation method, whereby a high density cathode active material having some of the N element more uniformly replaced with the M element will be obtained, as compared with a cathode active material of a lithium-containing composite oxide powder obtained by a conventional solid phase method.

Further, in step 2 of the present invention, the M element salt aqueous solution containing at least Zr and/or Ti is brought into contact and reacted with the lithium-containing composite oxide powder obtained in step 1, whereby the lithium-containing composite oxide powder to be finally obtained has a high Zr and/or Ti concentration in the vicinity of its surface and thereby provides an effect of improving heat stability with a small amount, and a cathode active material having improved stability and a small decrease of the density will be provided.

BEST MODE FOR CARRYING OUT THE INVENTION

The lithium-containing composite oxide produced by the present invention is represented by the formula $Li_pN_xM_yO_zF_a$. In the formula, p, x, y, z and a are as defined above. Particularly, p, x, y, z and a are preferably as follows. $0.95 \leq p \leq 1.2$, $0.95 \leq x < 1.00$, $0 < y \leq 0.05$, $1.9 \leq z \leq 2.1$ and $0 \leq a \leq 0.05$. Here, when a is larger than 0, the lithium-containing composite oxide is a composite oxide having some of its oxygen atoms replaced with fluorine atoms. In such a case, the safety of the obtained cathode active material will improve. p, x, y, z and a are particularly preferably as follows. $0.97 \leq p \leq 1.03$, $0.97 \leq x \leq 0.9995$, $0.0005 \leq y \leq 0.03$, $1.95 \leq z \leq 2.05$ and $0.001 \leq a \leq 0.01$.

In the above formula, the N element is at least one member selected from the group consisting of Co, Mn and Ni. Particularly, it is preferably Co, Ni, Co and Ni, Mn and Ni, or "Co and Ni and Mn".

In the present invention, the M element contains at least Al and contains at least either Zr or Ti. The M element may further contain at least one element selected from the group consisting of Al, alkaline earth metals and transition metal elements other than Co, Mn and Ni. The transition metal elements represents transition metals of Group 4, 5, 6, 7, 8, 9, 10, 11 and 12 of the Periodic Table. Among them, the M element preferably contains Al; Zr and/or Ti; and at least one element selected from the group consisting of Hf, Nb, Ta, Mg, Sn and Zn. Particularly, from the viewpoint of the capacity development properties, the safety, the cyclic durability, etc., the M element preferably contains Al, Ti, Zr, Nb or Mg.

It has been generally known that the stability of the cathode active material for a lithium secondary battery improves when Al is present. It has been known that with respect to a $LiCoO_2$ positive electrode having from 0.1 to 3 mol % of Co replaced with Al, the heat generation starting temperature increases by from 5 to 10° C. in DSC measurement to examine heat generation behavior by heating a cathode material in a charged state. This is considered to be because the structure of the cathode active material having replaced with Al suppresses strain accompanying the entrance and exit of Li, whereby the structure is hardly destroyed. However, if the amount of the added element increases, the capacity tends to decrease, and the cyclic properties tend to deteriorate. Further, it is considered that when an electrochemically stable compound such as Zr or Ti is present on the surface of the cathode material, reactivity with an electrolytic solution is suppressed, whereby stability and the cyclic properties will improve.

In the present invention, the M element forms a solid solution having some of the N element replaced with the M element, and since the Zr and/or Ti concentration is higher on the particle surface than the particle interior, whereby the reactivity with the electrolytic solution can be suppressed with a small addition amount of Zr and/or Ti, and the decrease in capacity can be reduced. The Zr and/or Ti content is from 0.1 to 30%, preferably from 0.5 to 20%, particularly preferably from 1 to 10% of all the M elements contained in a lithium-containing composite oxide powder to be finally obtained, on the basis of weight. Further, it is preferred that Zr and Ti coexist. The coexisting Zr/Ti atomic ratio is preferably 1/1. In such a case, a positive electrode comprising a lithium-containing composite oxide to be obtained has improved durability for charge and discharge cycles at high voltage.

Presence of Zr and/or Ti in lithium-containing composite oxide particles can be measured by ESCA, EPMA or the like. ESCA represents X-ray photoelectron spectroscopy, and EPMA represents electron probe micro analysis. ESCA is an elemental analysis means in the vicinity of the surface, and is capable of elemental analysis with etching in the depth direction. Further, the presence state of Zr and/or Ti can be confirmed by observation of a cross section of primary particles of the positive electrode powder with a high resolution electron microscope (HRTEM) or by measuring the covering layer on the surface of particles by EPMA. Where the surface corresponds to 0% and the center corresponds to 100% as the index to the depth direction from the particle surface to the center, on a surface and surface layer region of from 0 to 20% (in the present invention, this region will sometimes be referred to as the vicinity of the particle surface, and a region in the particle interior of from 21 to 100% will sometimes be referred to as a vicinity of the particle center), at least 50% (on the basis of atoms), particularly preferably at least 70% of the amount of Zr and/or Ti contained is present.

By the elemental analysis with etching in the depth direction by ESCA, it is preferred that a considerable amount of Zr and/or Ti introduced in step 2 is present within 200 nm from the surface. In the present invention, the form of Zr and/or Ti to be introduced in step 2 as the compound is not necessarily clear, but it is considered that a considerable amount is locally present as $ZrO_2$ or $TiO_2$ having low crystallinity on the surface as a covering layer, and in a case where Zr and Ti are used in an equal atomic ratio, a considerable amount of them are present in the form of a covering layer of $ZrTiO_4$ having low crystallinity.

In the present invention, as the M element source, an M element-containing carboxylate aqueous solution is used, and the M element is supplied from the carboxylate aqueous solution. The M element-containing carboxylate not only includes a carboxylic acid containing the M element in its molecule (such as an M element salt or an M element-containing complex of a carboxylic acid) but also includes a mixture of a carboxylic acid with a carboxylic acid containing the M element in the compound. In the present invention, the M element-containing carboxylate is preferably a carboxylate having at least two carboxyl groups or having at least two carboxyl group(s), hydroxyl group(s) or carbonyl group(s) in total, which is highly soluble and is capable of increasing the M element concentration in the aqueous solution. Particularly preferred is one having a molecular structure having from 2 to 4 carboxyl groups and having from one to four hydroxyl groups in addition, whereby the solubility is high. The M element-containing carboxylic acid is particularly preferably a $C_{2-8}$ aliphatic carboxylic acid. If the number of carbon atoms is 9 or more, the solubility of the carboxylic acid and the compound containing the M element in the aqueous solution tends to decrease. The number of carbon atoms is particularly preferably from 2 to 6.

The preferred $C_{2-8}$ aliphatic carboxylic acid may, for example, be citric acid, tartaric acid, oxalic acid, malonic acid, maleic acid, malic acid, racemic acid, lactic acid or glyoxylic acid, and it is particularly preferably citric acid, maleic acid, lactic acid or tartaric acid, which can increase the solubility and is available at a relatively low cost. When a carboxylic acid having high acidity is used, when the pH of an aqueous solution of a compound containing the carboxylic acid and the M element is less than 2, the compound is easily soluble in some cases depending upon the element of the N element source. Accordingly, it is preferred to add a base such as ammonia to bring the pH to from 2 to 12. If the pH exceeds 12, the compound is easily soluble depending upon the element of the N element source, such being undesirable in some cases.

In a case where in step 1 of the present invention, an N-M element coprecipitate precipitated by adding a pH adjuster and an alkali to an aqueous solution having an M element salt and an N element salt dissolved therein is used, a sulfate, a hydrochloride, a nitrate or the like of the N element and the M element may be used. The pH adjuster may, for example, be ammonia or ammonium bicarbonate. The alkali may, for example, be a hydroxide such as sodium hydroxide, potassium hydroxide or lithium hydroxide.

In step 1 of the present invention, as mentioned above, a plurality of elements are preferably contained as the M element and it is particularly preferred that the M element comprises Al and Mg in an Al/Mg atomic ratio of preferably from 1/3 to 3/1, particularly preferably from 2/3 to 3/2, and that y is preferably $0.005 \leq y \leq 0.025$, particularly preferably $0.01 \leq y \leq 0.02$, whereby the balance of the battery performance, i.e. the balance of the initial weight capacity density, the safety, and the stability for charge and discharge cycles, is good.

Further, in step 2 of the present invention, it is particularly preferred that the M element comprises Mg and M2 (wherein M2 is at least one element selected from the group consisting of Ti, Zr, Ta and Nb) in a M2/Mg atomic ratio of preferably from 1/40 to 2/1, more preferably from 1/30 to 1/5, and that y is preferably $0.005 \leq y \leq 0.025$, particularly preferably $0.01 \leq y \leq 0.02$, whereby the balance of the battery performance, i.e. the balance of the initial weight capacity density, the initial volume capacity density, the safety and the stability for charge and discharge cycles, is good.

Further, in step 2 of the present invention, it is preferred to use an M element salt aqueous solution containing Zr and Mg or an M element salt aqueous solution containing Ti and Mg. By use of such an M element salt aqueous solution, lithium-containing composite oxide particles containing (Zr and Mg) or (Ti and Mg) simultaneously in the vicinity of the particle surface can be obtained. Further, the compound to be contained in the vicinity of the surface more preferably contains a composite compound of Zr and Mg or a composite compound of Ti and Mg.

By use of a lithium-containing composite oxide containing (Zr and Mg) or (Ti and Mg) simultaneously in the vicinity of the surface of lithium-containing composite oxide particles, battery characteristics such as the safety tend to further improve. The mechanism is not clearly understood but is estimated as follows.

It has been known that at the time of charging, at the time of heating or when charge and discharge are repeatedly carried out, the electrolytic solution undergoes decomposition reaction to generate a gas containing carbon dioxide and the like. It is considered that since a compound containing an element such as Zr, Ti or Mg is contained in the vicinity of the particle surface, the active site on the particle surface and the compound containing Zr, Ti, Mg or the like react with each other, whereby generation of a gas by the decomposition reaction can be suppressed. Further, it is considered that a composite compound having higher reactivity with the active site on the particle surface is formed by (Zr and Mg) or (Ti and Mg) being contained simultaneously in the vicinity of the particle surface, whereby the battery characteristics further improve. It is considered that the decomposition reaction of the electrolytic solution is suppressed in such a manner and as a result, a battery can be stored for a long period of time in a charged state, and the safety is improved in addition.

The presence of Zr, Ti and Mg contained in the particle surface can be confirmed by ESCA or EPMA.

Further, in the present invention, it is particularly preferred that the M element comprises Zr and Mg in a Zr/Mg atomic ratio of preferably from 1/40 to 2/1, more preferably from 1/30 to 1/5 and that y is preferably $0.005 \leq y \leq 0.025$, particularly preferably $0.01 \leq y \leq 00.02$, whereby the balance of the battery performance, i.e. the balance of the initial weight capacity density, the initial volume capacity density, the safety and the stability for charge and discharge cycles, is good.

Further, in the present invention, it is particularly preferred that the M element comprises Mg and Al and further comprises Zr and/or Ti, whereby the balance of the battery performance, i.e. the balance of the initial weight capacity density, the initial volume capacity density, the safety and the stability for charge and discharge cycles, is particularly good. In such a case, Zr and/or Ti coexists preferably in an amount of from 1/2 to 1/20 based on the total number of mols of Mg and Al.

The M element-containing carboxylate aqueous solution to be used in the present invention is required to be a substantial aqueous solution, and a suspension and a colloidal solution are not included in the present invention, since no sufficient effects of the present invention will be obtained if a suspension or a colloidal solution is used. Further, a substantial aqueous solution means it may contain a colloid form or a suspension form at a part thereof, since the effects of the present invention are obtained.

The M element source to be used to prepare an aqueous solution of a compound containing the carboxylic acid and the M element is more preferably one which will uniformly be soluble or dispersed in the carboxylic acid aqueous solution to be used. For example, it may be an inorganic salt such as an oxide, a hydroxide, a carbonate or a nitrate, an organic salt such as an acetate, an oxalate or a citrate, an organic metal chelate complex, or a compound having a metal alkoxide stabilized by e.g. a chelate. Among them, it is particularly preferably an oxide, a hydroxide, an oxyhydroxide, a water soluble carbonate, a nitrate, an acetate, an oxalate or a citrate.

It is particularly preferably a citrate which has a high solubility. Further, an oxalate or citrate aqueous solution has a low pH and accordingly it may dissolve the N element from the N element source powder in a process of impregnating the N element source powder in some cases. In such a case, it is preferred to add ammonia to the carboxylic acid to adjust the pH to preferably from 2 to 12.

The M element source may, in the case of Al, for example, be aluminum oxide, aluminum hydroxide, aluminum nitrate, aluminum acetate, aluminum oxalate, aluminum citrate, aluminum lactate, basic aluminum lactate or aluminum maleate. Particularly, a carboxylate aqueous solution obtainable by using aluminum lactate and/or aluminum maleate is preferred, whereby the Al concentration in the aqueous solution can be made high. Further, for example, in the case of Zr, zirconium ammonium carbonate or a zirconium ammonium halide is preferred. Further, in the case of Ti, it is preferred to use a titanium lactate aqueous solution. Further, in the case of Mg, it is preferred to use magnesium carbonate, magnesium hydroxide, magnesium acetate, magnesium citrate or magnesium acetate, and magnesium carbonate is particularly preferred.

When an aqueous solution of a compound containing the carboxylic acid and the M element to be used in the present invention is prepared, preparation is carried out preferably with heating if necessary. Preparation is carried out with heating at preferably from 40° C. to 80° C., particularly preferably from 50° C. to 70° C. By heating, dissolution of the M element source will easily proceed, whereby the M element source can be stably dissolved in a short period of time.

The concentration of the above M element-containing carboxylate aqueous solution to be used in the present invention is preferably high from such a viewpoint that in the subsequent step, an aqueous medium is required to be removed by drying. However, if the concentration is too high, the viscosity tends to be high, and uniform mixing with another element source powder for forming a cathode active material tends to deteriorate, or the solution tends to be hardly penetrated to the N element source powder. Accordingly, it is preferably from 1 to 30 wt %, particularly preferably from 4 to 20 wt %.

To the M element-containing carboxylate aqueous solution, an alcohol such as methanol or ethanol, or a polyol having an effect to form a complex may be included. As such a polyol, ethylene glycol, propylene glycol, diethylene glycol, dipropylene glycol, polyethylene glycol, butanediol or glycerol may, for example, be mentioned. In such a case, the content is preferably from 1 to 20 wt %.

In the present invention, one of characteristics is that the M element-containing carboxylate aqueous solution is used as the M element source, and as a lithium source as another component contained in the lithium composite oxide, lithium carbonate or lithium hydroxide is preferably used. Lithium carbonate which is available at a low cost is particularly preferred. The lithium source is preferably a powder having an average particle size (D50) of from 2 to 25 μm. As the fluorine source, a metal fluoride such as LiF or $MgF_2$ is selected.

As the N element source to be used in the present invention, at least one member selected from the group consisting of a cobalt salt, a nickel salt, a manganese salt, a nickel-cobalt coprecipitate, a nickel-manganese coprecipitate, a cobalt-manganese coprecipitate and a nickel-cobalt-manganese coprecipitate, is used. The cobalt salt or the nickel salt may, for example, be a salt substantially insoluble in water, such as a hydroxide, an oxyhydroxide, an oxide or a carbonate. Specifically, in a case where the N element is cobalt, cobalt carbonate, cobalt hydroxide, cobalt oxyhydroxide, cobalt oxide or the like is preferably used. Particularly cobalt hydroxide or cobalt oxyhydroxide is preferred, with which the performance will easily be obtained. Further, in a case where the N element is nickel, nickel hydroxide, nickel oxyhydroxide, nickel oxide, nickel carbonate or the like is preferably used. In a case where the N element is manganese, manganese hydroxide, manganese carbonate, manganese oxyhydroxide, manganese oxide or the like is preferably used.

Further, as the nickel-cobalt coprecipitate, a nickel-cobalt coprecipitated hydroxide, a nickel-cobalt coprecipitated oxyhydroxide, a nickel-cobalt coprecipitated oxide or a nickel-cobalt coprecipitated carbonate is preferred. Further, specifically, as an N element source containing nickel and cobalt, $Li_{0.8}Co_{0.2}OOH$, $Ni_{0.8}Co_{0.2}(OH)_2$ or the like is preferably used.

In the present invention, in a case where the N element is Co, the molar ratio of Li to the sum of the N element and the M element in the lithium composite oxide, i.e. Li/(N+M) is particularly preferably from 0.97 to 1.03. In such a case, growth of particles of the lithium composite oxide will be accelerated, whereby particles having a higher density will be obtained.

As the lithium source to be used in the present invention, lithium carbonate or lithium hydroxide is preferably used. Lithium carbonate which is available at a low cost is particularly preferred. As the fluorine source, a metal fluoride such as LiF or $MgF_2$ is used.

In the present invention, in a case where the F element is incorporated in the lithium composite oxide, the F element is preferably present on the surface of lithium-containing composite oxide particles. By the presence of such an element on the surface, the important battery characteristics such as the safety and the cyclic charge and discharge properties can be improved by its addition in a small amount without bringing about the reduction of the battery performance. The presence of such an element on the surface can be judged by carrying out a spectroscopic analysis such as an XPS analysis with respect to the cathode particles.

In the present invention, an M element-containing carboxylate aqueous solution is used as the M element source, the M element-containing carboxylate is a carboxylate having at least two carboxyl groups or having at least two carboxyl group(s), hydroxyl group(s) and carbonyl group(s) in total, and step 1 of preliminarily mixing an N element source, an M element source and if necessary, a fluorine source and firing the mixture in an oxygen-containing atmosphere at from 700° C. to 1,100° C. to obtain a lithium-containing composite oxide powder, and step 2 of mixing an M element-containing carboxylate aqueous solution containing at least one of Zr and Ti and if necessary, a fluorine source, removing an aqueous medium from the obtained mixture and firing the mixture in an oxygen-containing atmosphere at from 300 to 1,100° C., are carried out.

In the present invention, the lithium-containing composite oxide powder is produced through steps 1 and 2 as mentioned above. In step 1, a mixture containing a lithium source, an N element source, an M element source, and if necessary, a fluorine source is fired in an oxygen-containing atmosphere at from 700 to 1,100° C., preferably from 850 to 1,050° C. to obtain a lithium-containing composite oxide powder. As the lithium source, the N element source and the fluorine source, the above-mentioned respective compounds may be used alone, but in some cases, a composite oxide containing two or more of the lithium source, the N element source and the fluorine source may be used. For example, as the lithium source and the N element source, a lithium-containing composite oxide containing an N element may, for example, be used.

In step 2 of the present invention, the lithium-containing composite oxide powder obtained in step 1, an M element salt aqueous solution containing at least Zr and/or Ti, and if necessary, a fluorine source are mixed, an aqueous medium is removed from the obtained mixture, and the mixture is fired in an oxygen-containing atmosphere at from 300 to 1,100° C., preferably from 350 to 650° C. to obtain a lithium-containing composite oxide.

In steps 1 and 2, as a method of mixing the M element salt aqueous solution with the N element source powder, the lithium source powder, the fluorine source and further, the lithium composite oxide powder and the like, a means of impregnating the M element salt aqueous solution into the respective component powders by spraying, or a means of charging the respective component powders to the M element salt aqueous solution accommodated in a container, followed by stirring for impregnation, may, for example, be employed. Further, a means of mixing the M element salt aqueous solution with the respective component powders to form a slurry by using a twin screw kneader, an axial mixer, a paddle mixer, a turbulizer or the like. In such a case, the solid content concentration in the slurry is preferably higher so long as mixing can be carried out uniformly, but usually the solid/liquid ratio (on the basis of weight) is preferably from 30/70 to 90/10, particularly preferably from 50/50 to 80/20. Further, it is preferred to carry out vacuum treatment in the above slurry state, whereby the solution may more readily penetrate into the respective component powders.

In steps 1 and 2, when the aqueous medium is removed from the mixture of the M element salt aqueous solution and the respective component powders, removal is carried out by drying the mixture at preferably from 50 to 200° C., particularly preferably from 80 to 120° C. usually for from 0.1 to 10 hours. The aqueous medium in the mixture may not necessarily be completely removed at this stage since it will be removed in the subsequent firing step, but it is preferably removed as far as possible, since a large quantity of energy will be required to evaporate water in the firing step.

In the present invention, drying of the mixture is carried out, and if necessary, granulation of the mixture is carried out preferably simultaneously, and as the method, spray drying, flash drying, a belt dryer, a Loedige mixer or a twin screw dryer such as a thermoprocessor or a paddle dryer may, for example, be mentioned. Among them, spray drying is particularly preferred as the productivity is thereby high. In a case where spray drying is employed for the drying or granulation means, the size of the granulated particles consisting of secondary particles after the granulation may be controlled by selecting the spraying system, the pressurizing gas-supply rate, the slurry supply rate, the drying temperature, etc.

In the present invention, the particle size of the precursor of the lithium composite oxide before firing, consisting of secondary particles after the drying and granulation, is substantially reflected on the particle size of the lithium-containing composite oxide to be finally obtained in the present invention. In the present invention, the average particle size (D50) of the precursor consisting of agglomerates of secondary particles after drying is preferably from 5 to 25 μm. If the average particle size is smaller than 5 μm, the press density of the lithium-containing composite oxide tends to be low, and consequently, the volume packaging density of the positive electrode tends to be low, and the volume capacity density of the battery tends to be low, such being undesirable. Further, if it exceeds 25 μm, it tends to be difficult to obtain a flat and smooth positive electrode surface, such being undesirable. A particularly preferable average particle size of the precursor is from 8 to 20 μm.

In the present invention, the average particle size (D50) means a volume basis cumulative 50% size (D50), which is determined by obtaining a volume basis particle size distribution to prepare a cumulative curve with the total volume being 100% and which is the particle size at a point where the cumulative curve becomes 50%. The particle size distribution is obtained by the frequency distribution measured and a cumulative volume distribution curve by a laser scattering particle size distribution measuring apparatus. The measurement of the particle size is carried out by measuring the particle size distribution by dispersing the particles sufficiently in an aqueous medium by e.g. ultrasonic treatment (using, for example, Microtrac HRAX-100, manufactured by Leeds & Northrup Company).

Firing in step 1 in the process for producing a lithium composite oxide of the present invention is carried out at preferably from 700 to 1,100° C. in an oxygen-containing atmosphere. If such a firing temperature is lower than 700° C., conversion to the lithium composite oxide tends to be incomplete. On the other hand if it exceeds 1,100° C., the durability for charge and discharge cycles or the initial capacity tends to be low. The firing temperature is particularly preferably from 850 to 1,050° C.

Firing in step 2 after mixing with the M element salt aqueous solution is carried out at from 300 to 1,100° C., preferably from 350 to 650° C. in an oxygen-containing atmosphere, since a lithium composite oxide is preliminarily formed.

Of the lithium-containing composite oxide thus produced, the average particle size D50 is preferably from 5 to 30 μm, particularly preferably from 8 to 25 μm; the specific surface area is preferably from 0.1 to 0.7 m$^2$/g, particularly preferably from 0.15 to 0.5 m$^2$/g; the half value width of the diffraction peak of (110) plane at 2θ=66.5±1° as measured by means of X-ray diffraction analysis using CuKα rays as the radiation source, is preferably from 0.08 to 0.14°, particularly preferably from 0.08 to 0.12°; and the press density is preferably from 3.65 to 4.10 g/cm$^3$, particularly preferably from 3.70 to 4.00 g/cm$^3$ in a case where the N element is cobalt. In the present invention, the press density means an apparent density of the powder, when the lithium composite oxide powder is pressed under a pressure of 2 ton/cm$^2$.

Further, the lithium-containing composite oxide obtained by the present invention is preferably such that the amount of remaining alkali is preferably at most 0.03 wt %, particularly preferably at most 0.01 wt %.

In the case of lithium-containing composite oxide particles, the average particle size (D50) is meant for a volume average particle size with respect to secondary particles having primary particles agglomerated and sintered one another, and in a case where particles consist of only primary particles, it is meant for a volume average particle size with respect to the primary particles.

In a case where the positive electrode for a lithium secondary battery of the present invention is to be produced from such a lithium-containing composite oxide, the powder of such a composite oxide is mixed with a binder material and a carbon type electroconductive material such as acetylene black, graphite or Ketjenblack. As such a binder material, polyvinylidene fluoride, polytetrafluoroethylene, polyamide, carboxymethyl cellulose or an acrylic resin may, for example, be preferably employed. By using a solvent or a dispersant, the powder of the lithium-containing composite oxide of the present invention, the electroconductive material and the binder material are formed into a slurry or a kneaded product, which is then supported on a positive electrode current collector such as an aluminum foil or a stainless steel foil by e.g. coating to form the positive electrode for a lithium secondary battery of the present invention.

In a lithium secondary battery wherein the lithium-containing composite oxide of the present invention is used as a cathode active material, a film of a porous polyethylene or a porous polypropylene may, for example, be used as a separator. Further, as the solvent for the electrolytic solution of the battery, various solvents may be used, but among them, a carbonate ester is preferred. As such a carbonate ester, each of a cyclic type and a chain type may be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the lithium secondary battery of the present invention, the above carbonate ester may be used alone or two or more of them may be used as mixed. Otherwise, the above carbonate ester may be used as mixed with other solvents. Further, depending upon the material for an anode active material, a chain type carbonate ester and a cyclic type carbonate ester may be used in combination, whereby the discharge properties, the cyclic durability or the charge and discharge efficiency may sometimes be improved.

Further, in the lithium secondary battery using the lithium-containing composite oxide of the present invention as the cathode active material, a gel polymer electrolyte containing a vinylidene fluoride-hexafluoropropylene copolymer (for example, KYNAR, tradename, manufactured by ELF Atochem) or a vinylidene fluoride-perfluoropropyl vinyl ether copolymer, may be employed. As the solute to be added to the solvent for the electrolyte or to the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The lithium salt as the solute is added at a concentration of preferably from 0.2 to 2.0 mol/L (liter) to the solvent for the electrolyte or to the polymer electrolyte. If the concentration departs from this range, ionic conductivity will decrease, and is the electrical conductivity of the electrolyte will decrease. Particularly preferably, it is from 0.5 to 1.5 mol/L.

In the lithium secondary battery using the lithium-containing composite oxide of the present invention as the cathode active material, as the anode active material, a material which can occlude and discharge lithium ions may be used. The material to form such an anode active material is not particularly limited, however, lithium metal, a lithium alloy, a carbon material, an oxide comprising, as a main component, a metal of Group 14 or 15 of the Periodic Table, a carbon compound, a silicon carbide compound, a silicon oxide compound, titanium sulfide or a boron carbide compound may, for example, be mentioned. As the carbon material, one having an organic material thermally decomposed under various thermal decomposition conditions, artificial graphite, natural graphite, soil graphite, exfoliated graphite or flake graphite, may, for example, be used. Further, as the oxide, a compound comprising tin oxide as a main component may be used. As the negative electrode current collector, a copper foil or a nickel foil may, for example, be used. The negative electrode may be produced preferably by kneading the active material with an organic solvent to form a slurry, which is applied to a metal foil current collector, followed by drying and pressing.

The shape of the lithium secondary battery using the lithium-containing composite oxide of the present invention as the cathode active material is not particularly limited. A sheet, film, folding, winding type cylinder with bottom or button shape is selected for use depending upon the particular purpose.

EXAMPLES

Now, the present invention will be described in further detail with reference to Examples. However, the present invention is by no means restricted to such specific Examples.

Hereinafter, the percentage (%) representing the amount of metal (metal content) contained in the materials for the lithium-containing composite oxide, means wt % unless otherwise specified.

Example 1

Example of the Invention

To an aqueous solution having a pH of 2.3, having 1.94 g of magnesium carbonate, 20.97 g of an aluminum maleate aqueous solution having an Al content of 2.65% and 7.21 g of citric acid monohydrate mixed with 29.88 g of water, 198.21 g of cobalt oxyhydroxide having a cobalt content of 60.0% and having an average particle size of 13 μm was added and mixed. The obtained mixture was dried in a constant temperature oven at 80° C. and then mixed with 76.43 g of lithium carbonate having a lithium content of 18.7% in a mortar, and the mixture was fired in an oxygen-containing atmosphere at 990° C. for 14 hours to obtain a lithium-containing composite oxide having a composition of $Li_{1.0}Co_{0.98}Mg_{0.01}Al_{0.01}O_2$.

To 200 g of the above lithium-containing composite oxide, an aqueous solution having a pH of 2.7, having 6.09 g of a titanium lactate aqueous solution having a Ti content of 8.10% diluted with 43.91 g of water, was added, and dried at 120° C. for 4 hours with stirring and mixing. The obtained powder was fired in an oxygen-containing atmosphere at 500° C. for 12 hours to obtain a substantially spherical lithium-containing composite oxide powder having an average particle size of 13.5 μm, D10 of 6.2 μm, D90 of 18.3 μm and a specific surface area of 0.33 m²/g. The obtained composition was $Li_{0.995}Co_{0.975}Mg_{0.01}Al_{0.01}Ti_{0.005}O_2$.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.110°. The press density of this powder was 3.12 g/cm³.

The cross section of the obtained lithium-containing composite oxide powder was embedded in a resin, and the cross section of the particles polished with fine cerium oxide particles was subjected to Ti mapping by EPMA and as a result, Ti was detected in a larger amount on the particle outer surface than the particle interior. The amount of Ti contained in the lithium-containing composite oxide was 20 mol % of all the M elements.

The above lithium-containing composite oxide powder, acetylene black and a polyvinylidene fluoride powder were mixed in a weight ratio of 90/5/5, and N-methylpyrrolidone was added to form a slurry, which was applied to one side of an aluminum foil having a thickness of 20 μm by a doctor blade. After drying, roll pressing was carried out five times to obtain a positive electrode sheet for a lithium battery.

And, using one punched out from the positive electrode sheet as a positive electrode, using a metal lithium foil having a thickness of 500 μm as a negative electrode, using a nickel foil of 20 μm as a negative electrode current collector, using a porous polypropylene having a thickness of 25 μm as a separator and using a solution of $LiPF_6$/EC+DEC (1:1) having a concentration of 1M (it means a mixed solution of EC and DEC in a weight ratio of 1:1 wherein $LiPF_6$ is the solute, the same applies to solvents mentioned hereinafter) as an electrolytic solution, a pair of simplified sealed cell type lithium batteries made of stainless steel were assembled in an argon globe box.

One battery was charged up to 4.3 V at a load current of 75 mA per 1 g of the cathode active material at 25° C., and discharged down to 2.5 V at a load current of 75 mA per 1 g of the cathode active material, whereby the initial discharge capacity was obtained. Further, the density of the electrode layer was obtained. Further, with this battery, the charge and discharge cyclic test was sequentially carried out 30 times. As a result, the initial weight capacity density of the positive electrode layer at from 2.5 to 4.3 V at 25° C. was 155 mAh/g and the capacity retention after 30 times of charge and discharge cycle was 99.1%.

Further, the other battery was charged for 10 hours at 4.3 V, and then disassembled in the argon globe box, and the positive electrode sheet after the charging was taken out. The positive electrode sheet was washed, then punched out with a diameter of 3 mm and sealed in an aluminum capsule together with EC, and then, it was heated at a rate of 5° C./min by using a scanning differential calorimeter to measure the heat generation starting temperature. As a result, the heat generation starting temperature in the heat generation curve of the 4.3 V charged product was 164° C.

Example 2

Comparative Example

To an aqueous solution having 1.95 g of magnesium carbonate, 20.99 g of an aluminum maleate aqueous solution having an Al content of 2.65%, 6.09 g of a titanium lactate aqueous solution having a Ti content of 8.1% and 10.11 g of citric acid monohydrate mixed with 20.86 g of water, 197.38 g of cobalt oxyhydroxide having a cobalt content of 60.0% and having an average particle size of 13 μm was added and mixed. The obtained mixture was dried in a constant temperature oven at 80° C. and then mixed with 76.12 g of lithium carbonate having a lithium content of 18.7% in a mortar, and the mixture was fired in an oxygen-containing atmosphere at 990° C. for 14 hours to obtain a fired product having a composition of $Li_{0.995}Co_{0.975}Mg_{0.01}Al_{0.01}Ti_{0.005}O_2$.

The above fired product was crushed and the particle size distribution of the obtained lithium-containing composite oxide powder was measured in a water solvent by means of a laser scattering type particle size distribution measuring apparatus. As a result, the average particle size D50 was 13.1 μm, D10 was 6.0 μm, and D90 was 18.5 μm, and a substantially spherical lithium-containing composite oxide powder having a specific surface area of 0.30 $m^2$/g as obtained by means of BET method, was obtained.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.114°. The press density of this powder was 3.10 g/$cm^3$.

The cross section of the obtained lithium-containing composite oxide was embedded in a resin, and the cross section of the particles polished with fine cerium oxide particles was subjected to Ti mapping by EPMA and as a result, Ti element was detected uniformly in the entire particles. The amount of Ti contained in the lithium-containing composite oxide was 20 mol % of all the M elements.

Electrodes and batteries were prepared and evaluated in the same manner as in Example 1 except that the positive electrode sheet was prepared by using the above lithium-containing composite oxide.

As a result, the initial weight capacity density of the positive electrode layer at from 2.5 to 4.3 V at 25° C. was 149 mAh/g, and the capacity retention after 30 times of charge and discharge cycle was 97.7%.

Further, the heat generation starting temperature was measured by heating the battery at a rate of 5° C./min by using a scanning differential calorimeter and as a result, the heat generation starting temperature in the heat generation curve of the 4.3 V charged product was 159° C.

Example 3

Example of the Invention

To an aqueous solution having 1.94 g of magnesium carbonate, 20.93 g of an aluminum maleate aqueous solution having an Al content of 2.65% and 7.20 g of citric acid monohydrate mixed with 29.93 g of water, 197.90 g of cobalt oxyhydroxide having a cobalt content of 60.0% and having an average particle size of 13 μm was added and mixed. The obtained mixture was dried in a constant temperature oven at 80° C. and then mixed with 77.08 g of lithium carbonate having a lithium content of 18.7% in a mortar, and the mixture was fired in an oxygen-containing atmosphere at 990° C. for 14 hours to obtain a fired product having a composition of $Li_{1.005}Co_{0.975}Mg_{0.01}Al_{0.01}O_2$.

The above fired product was crushed and the particle size distribution of the obtained lithium-containing composite oxide powder was measured in a water solvent by means of a laser scattering type particle size distribution measuring apparatus. As a result, the average particle size D50 was 12.7 μm, D10 was 5.6 μm, and D90 was 18.0 μm, and a substantially spherical lithium-containing composite oxide powder having a specific surface area of 0.26 $m^2$/g as obtained by means of BET method, was obtained.

To 200 g of the above lithium-containing composite oxide, an aqueous solution having a pH of 8.5, having 1.28 g of a zirconium ammonium carbonate aqueous solution having a Zr content of 14.5% diluted with 48.27 g of water, was added, and dried at 120° C. for 4 hours with stirring and mixing. The obtained powder was fired in an oxygen-containing atmosphere at 500° C. for 12 hours to obtain a substantially spherical lithium-containing composite oxide powder having an average particle size of 12.7 μm, D10 of 5.8 μm, D90 of 18.3 μm and a specific surface area of 0.29 $m^2$/g. The obtained composition was $Li_{1.004}Co_{0.974}Mg_{0.01}Al_{0.01}Zr_{0.001}O_2$.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.108°. The press density of this powder was 3.14 g/$cm^3$.

The cross section of the obtained lithium-containing composite oxide powder was embedded in a resin, and the cross section of the particles polished with fine cerium oxide particles was subjected to Zr mapping by EPMA and as a result, Zr element was detected in a larger amount on the particle outer surface than the particle interior. The amount of Zr contained in the lithium-containing composite oxide was 4.8 mol % of all the M elements.

Electrodes and batteries were prepared and evaluated in the same manner as in Example 1 except that the positive electrode sheet was prepared by using the above lithium-containing composite oxide.

As a result, the initial weight capacity density of the positive electrode layer at from 2.5 to 4.3 V at 25° C. was 154 mAh/g, and the capacity retention after 30 times of charge and discharge cycle was 99.1%.

Further, the heat generation starting temperature was measured by heating the battery at a rate of 5° C./min by using a scanning differential calorimeter and as a result, the heat generation starting temperature in the heat generation curve of the 4.3 V charged product was 163° C.

Example 4

Comparative Example

To an aqueous solution having 1.94 g of magnesium carbonate, 20.92 g of an aluminum maleate aqueous solution having an Al content of 2.65%, 7.77 g of citric acid monohydrate mixed with 28.07 g of water, an aqueous solution obtained by mixing 1.29 g of a zirconium ammonium carbonate aqueous solution having a zirconium content of 14.5% and 197.62 g of cobalt oxyhydroxide having a cobalt content of 60.0% and having an average particle size of 13 μm were added and mixed. The obtained mixture was dried in a constant temperature oven at 80° C. and then mixed with 77.04 g of lithium carbonate having a lithium content of 18.7% in a mortar, and the mixture was fired in an oxygen-containing atmosphere at 990° C. for 14 hours to obtain a fired product having a composition of $Li_{1.005}Co_{0.974}Mg_{0.01}Al_{0.01}Zr_{0.001}O_2$.

The above fired product was crushed and the particle size distribution of the obtained lithium-containing composite oxide powder was measured in a water solvent by means of a laser scattering type particle size distribution measuring apparatus. As a result, the average particle size D50 was 12.9 μm, D10 was 5.9 μm, and D90 was 18.4 μm, and a substantially spherical lithium-containing composite oxide powder having a specific surface area of 0.27 m²/g as obtained by means of BET method, was obtained.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.106°. The press density of this powder was 3.16 g/cm³.

The cross section of the obtained lithium-containing composite oxide powder was embedded in a resin, and the cross section of the particles polished with fine cerium oxide particles was subjected to Zr mapping by EPMA and as a result, Zr element was detected uniformly in the entire particles. The amount of Zr contained in the lithium-containing composite oxide was 4.8 mol % of all the M elements.

Electrodes and batteries were prepared and evaluated in the same manner as in Example 1 except that the positive electrode sheet was prepared by using the above lithium-containing composite oxide.

As a result, the initial weight capacity density of the positive electrode layer at from 2.5 to 4.3 V at 25° C. was 150 mAh/g, and the capacity retention after 30 times of charge and discharge cycle was 97.5%.

Further, the heat generation starting temperature was measured by heating the battery at a rate of 5° C./min by using a scanning differential calorimeter and as a result, the heat generation starting temperature in the heat generation curve of the 4.3 V charged product was 159° C.

Example 5

Example of the Invention 683.08 g of cobalt sulfate heptahydrate, 110.92 g of magnesium sulfate heptahydrate and 20.53 g of aluminum sulfate were dissolved in 2,000 g of water, and in a reaction bath kept at 60° C., a 1N NaOH aqueous solution was added until the pH became 11.0 to obtain a coprecipitate. The coprecipitate was washed with pure water five times and dried at 120° C. for 6 hours to obtain a hydroxide having a composition of $Co_{0.98}Mg_{0.01}Al_{0.01}(OH)_2$.

199.87 g of the obtained hydroxide and 76.43 g of lithium carbonate were mixed in a mortar and fired in an oxygen-containing atmosphere at 990° C. for 14 hours to obtain a lithium-containing composite oxide having a composition of $Li_{1.00}Co_{0.98}Mg_{0.01}Al_{0.01}O_2$.

To 200 g of the above lithium-containing composite oxide, an aqueous solution having 1.29 g of a zirconium ammonium carbonate aqueous solution having a Zr content of 14.5% diluted with 48.71 g of water, was added and dried at 120° C. for 4 hours with stirring and mixing. The obtained powder was fired in an oxygen-containing atmosphere at 400° C. for 12 hours to obtain a lithium-containing composite oxide. The obtained composition was $Li_{0.999}Co_{0.979}Mg_{0.01}Al_{0.01}Zr_{0.001}O_2$.

The above lithium-containing composite oxide was crushed and the particle size distribution of the obtained lithium-containing composite oxide powder was measured in a water solvent by means of a laser scattering type particle size distribution measuring apparatus. As a result, the average particle size D50 was 11.0 μm, D10 was 5.3 μm, and D90 was 17.1 μm, and a substantially spherical lithium-containing composite oxide powder having a specific surface area of 0.34 m²/g as obtained by means of BET method, was obtained.

With respect to this lithium-containing composite oxide powder, an X-ray diffraction spectrum was obtained by using an X-ray diffraction apparatus (RINT 2100 model, manufactured by Rigaku Corporation) In the powder X-ray diffraction using CuKα ray, the half value width of the diffraction peak of (110) plane at 2θ=66.5±1° was 0.107°. The press density of this powder was 3.04 g/cm³.

The cross section of the obtained lithium-containing composite oxide powder was embedded in a resin, and the cross section of the particles polished with fine cerium oxide particles was subjected to Zr mapping by EPMA and as a result, Zr element was detected in a larger amount on the particle outer surface than the particle interior. The amount of Zr contained in the lithium-containing composite oxide was 4.8 mol % of all the M elements.

Electrodes and batteries were prepared and evaluated in the same manner as in Example 1 except that the positive electrode sheet was prepared by using the above lithium-containing composite oxide powder. As a result, the initial weight capacity density of the positive electrode layer at from 2.5 to 4.3 V at 25° C. was 155 mAh/g, and the capacity retention after 30 times of charge and discharge cycle was 99.2%.

Further, the heat generation starting temperature was measured by heating the battery at a rate of 5° C./min by using a scanning differential calorimeter and as a result, the heat generation starting temperature in the heat generation curve of the 4.3 V charged product was 165° C.

Example 6

Comparative Example 674.65 g of cobalt sulfate heptahydrate, 110.92 g of magnesium sulfate heptahydrate, 66.72 g of aluminum sulfate and 21.32 g of zirconium sulfate tetrahydrate were dissolved in 2,000 g of water, and in a reaction bath kept at 60° C., a 1N NaOH aqueous solution was added until the pH became 11.0 to obtain a coprecipitate. The coprecipitate was washed with pure water five times and dried at 120° C. for 6 hours to obtain a hydroxide having a composition of $Co_{0.979}Mg_{0.01}Al_{0.01}Zr_{0.001}(OH)_2$.

201.28 g of the obtained hydroxide and 76.40 g of lithium carbonate were mixed in a mortar and fired in an oxygen-containing atmosphere at 990° C. for 14 hours to obtain a fired product having a composition of $Li_{1.00}Co_{0.979}Mg_{0.01}Al_{0.01}Zr_{0.001}O_2$.

The above fired product was crushed and the particle size distribution of the obtained lithium-containing composite oxide powder was measured in a water solvent by means of a laser scattering type particle size distribution measuring apparatus. As a result, the average particle size D50 was 11.1 μm, D10 was 5.7 μm, and D90 was 17.8 μm, and a substantially spherical lithium-containing composite oxide powder having a specific surface area of 0.34 m$^2$/g as obtained by means of BET method, was obtained.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.109°. The press density of this powder was 3.03 g/cm$^3$.

The cross section of the obtained lithium-containing composite oxide powder was embedded in a resin, and the cross section of the particles polished with fine cerium oxide particles was subjected to Zr mapping by EPMA and as a result, Zr element was detected uniformly in the entire particles. The amount of Zr contained in the lithium-containing composite oxide was 4.8 mol % of all the M elements.

Electrodes were prepared and evaluated in the same manner as in Example 1 except that the positive electrode sheet was prepared by using the above lithium-containing composite oxide powder. As a result, the initial weight capacity density of the positive electrode layer at from 2.5 to 4.3 V at 25° C. was 149 mAh/g, and the capacity retention after 30 times of charge and discharge cycle was 97.4%.

Further, the heat generation starting temperature was measured by heating the battery at a rate of 5° C./min by using a scanning differential calorimeter and as a result, the heat generation starting temperature in the heat generation curve of the 4.3 V charged product was 158° C.

Example 7

Example of the Invention

To an aqueous solution having 1.94 g of magnesium carbonate, 20.97 g of an aluminum maleate aqueous solution having an Al content of 2.65% and 7.21 g of citric acid monohydrate mixed with 29.88 g of water, 198.21 g of cobalt oxyhydroxide having a cobalt content of 60.0% and having an average particle size of 13 μm was added and mixed. The obtained mixture was dried in a constant temperature oven at 80° C. and then mixed with 76.43 g of lithium carbonate having a lithium content of 18.7% in a mortar, and the mixture was fired in an oxygen-containing atmosphere at 990° C. for 14 hours to obtain a fired product having a composition of $Li_{1.00}Co_{0.98}Mg_{0.01}Al_{0.01}O_2$.

The above fired product was crushed and the particle size distribution of the obtained lithium-containing composite oxide powder was measured in a water solvent by means of a laser scattering type particle size distribution measuring apparatus. As a result, the average particle size D50 was 13.0 μm, D10 was 5.9 μm, and D90 was 18.2 μm, and a substantially spherical lithium-containing composite oxide powder having a specific surface area of 0.30 m$^2$/g as obtained by means of BET method, was obtained.

To 200 g of the above lithium-containing composite oxide, an aqueous solution having a pH of 3.5, obtained by dissolving 0.12 g of magnesium carbonate and 0.29 g of citric acid monohydrate in 48.37 g of water and then adding 1.22 g of a titanium lactate aqueous solution having a Ti content of 8.1%, was added, and dried at 120° C. for 4 hours with stirring and mixing. The obtained powder was fired in an oxygen-containing atmosphere at 500° C. for 12 hours to obtain a substantially spherical lithium-containing composite oxide powder having an average particle size of 13.3 μm, D10 of 6.1 μm, D90 of 18.2 μm and a specific surface area of 0.38 m$^2$/g. The obtained composition was $Li_{0.998}Co_{0.978}Mg_{0.011}Al_{0.01}Ti_{0.001}O_2$.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.112°. The press density of this powder was 3.07 g/cm$^3$.

The cross section of the obtained lithium-containing composite oxide powder was embedded in a resin, and the cross section of the particles polished with fine cerium oxide particles was subjected to Ti mapping by EPMA and as a result, Ti element was detected in a larger amount on the particle outer surface than the particle interior. The amount of Ti contained in the lithium-containing composite oxide was 4.9 mol % of all the M elements.

Electrodes and batteries were prepared and evaluated in the same manner as in Example 1 except that the positive electrode sheet was prepared by using the above lithium-containing composite oxide.

As a result, the initial weight capacity density of the positive electrode layer at from 2.5 to 4.3 V at 25° C. was 153 mAh/g, and the capacity retention after 30 times of charge and discharge cycle was 98.9%.

Further, the heat generation starting temperature was measured by heating the battery at a rate of 5° C./min by using a scanning differential calorimeter and as a result, the heat generation starting temperature in the heat generation curve of the 4.3 V charged product was 169° C.

Example 8

Example of the Invention

To an aqueous solution having 1.94 g of magnesium carbonate, 20.97 g of an aluminum maleate aqueous solution having an Al content of 2.65% and 7.21 g of citric acid monohydrate mixed with 29.88 g of water, 198.21 g of cobalt oxyhydroxide having a cobalt content of 60.0% and having an average particle size of 13 μm was added and mixed. The obtained mixture was dried in a constant temperature oven at 80° C. and then mixed with 76.43 g of lithium carbonate having a lithium content of 18.7% in a mortar, and the mixture was fired in an oxygen-containing atmosphere at 990° C. for 14 hours to obtain a fired product having a composition of $Li_{1.00}Co_{0.98}Mg_{0.01}Al_{0.01}O_2$.

The above fired product was crushed and the particle size distribution of the obtained lithium-containing composite oxide powder was measured in a water solvent by means of a laser scattering type particle size distribution measuring apparatus. As a result, the average particle size D50 was 13.0 μm, D10 was 5.9 μm, and D90 was 18.2 μm, and a substantially spherical lithium-containing composite oxide powder having a specific surface area of 0.30 m²/g as obtained by means of BET method, was obtained.

To 200 g of the above lithium-containing composite oxide, an aqueous solution having a pH of 6.5, obtained by dissolving 0.12 g of magnesium carbonate and 0.29 g of citric acid monohydrate in 48.37 g of water and adding 1.31 g of a zirconium ammonium carbonate aqueous solution having a Zr content of 14.5%, was added, and dried at 120° C. for 4 hours with stirring and mixing. The obtained powder was fired in an oxygen-containing atmosphere at 500° C. for 12 hours to obtain a substantially spherical lithium-containing composite oxide powder having an average particle size of 13.2 μm, D10 of 6.0 μm, D90 of 18.0 μm and a specific surface area of 0.36 m²/g. The obtained composition was $Li_{0.998}Co_{0.978}Mg_{0.011}Al_{0.01}Zr_{0.001}O_2$.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.109°. The press density of this powder was 3.06 g/cm³.

The cross section of the obtained lithium-containing composite oxide powder was embedded in a resin, and the cross section of the particles polished with fine cerium oxide particles was subjected to Zr mapping by EPMA and as a result, Zr element was detected in a larger amount on the particle outer surface than the particle interior. The amount of Zr contained in the lithium-containing composite oxide was 4.8 mol % of all the M elements.

Electrodes and batteries were prepared and evaluated in the same manner as in Example 1 except that the positive electrode sheet was prepared by using the above lithium-containing composite oxide.

As a result, the initial weight capacity density of the positive electrode layer at from 2.5 to 4.3 V at 25° C. was 154 mAh/g and the capacity retention after 30 times of charge and discharge cycle was 99.0%.

Further, the heat generation starting temperature was measured by heating the battery at a rate of 5° C./min by using a scanning differential calorimeter and as a result, the heat generation starting temperature in the heat generation curve of the 4.3 V charged product was 168° C.

Example 9

Example of the Invention

To an aqueous solution having 1.94 g of magnesium carbonate, 20.97 g of an aluminum maleate aqueous solution having an Al content of 2.65% and 7.21 g of citric acid monohydrate mixed with 29.88 g of water, 198.21 g of cobalt oxyhydroxide having a cobalt content of 60.0% and having an average particle size of 13 μm was added and mixed. The obtained mixture was dried in a constant temperature oven at 80° C. and then mixed with 76.43 g of lithium carbonate having a lithium content of 18.7% in a mortar, and the mixture was fired in an oxygen-containing atmosphere at 990° C. for 14 hours to obtain a fired product having a composition of $Li_{1.00}Co_{0.98}Mg_{0.01}Al_{0.01}O_2$.

The above fired product was crushed and the particle size distribution of the obtained lithium-containing composite oxide powder was measured in a water solvent by means of a laser scattering type particle size distribution measuring apparatus. As a result, the average particle size D50 was 13.0 μm, D10 was 5.9 μm, and D90 was 18.2 μm, and a substantially spherical lithium-containing composite oxide powder having a specific surface area of 0.30 m²/g as obtained by means of BET method, was obtained.

To 200 g of the above lithium-containing composite oxide, an aqueous solution having a pH of 4.0, obtained by dissolving 0.58 g of citric acid monohydrate in 46.89 g of water, adding 1.22 g of a titanium lactate aqueous solution having a Ti content of 8.1% and further adding 1.31 g of a zirconium ammonium carbonate aqueous solution having a Zr content of 14.5%, was added, and dried at 120° C. for 4 hours with stirring and mixing. The obtained powder was fired in an oxygen-containing atmosphere at 500° C. for 12 hours to obtain a substantially spherical lithium-containing composite oxide powder having an average particle size of 13.3 μm, D10 of 6.2 μm, D90 of 18.3 μm and a specific surface area of 0.35 m²/g. The obtained composition was $Li_{0.998}Co_{0.978}Mg_{0.01}Al_{0.01}Zr_{0.001}Ti_{0.001}O_2$.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.106°. The press density of this powder was 3.09 g/cm³.

The cross section of the obtained lithium-containing composite oxide powder was embedded in a resin, and the cross section of the particles polished with fine cerium oxide particles was subjected to Zr and Ti mapping by EPMA and as a result, Zr and Ti elements were detected in a larger amount on the particle outer surface than the particle interior. The total amount of Zr and Ti contained in the lithium-containing composite oxide was 9.9 mol % of all the M elements.

Electrodes and batteries were prepared and evaluated in the same manner as in Example 1 except that the positive electrode sheet was prepared by using the above lithium-containing composite oxide.

As a result, the initial weight capacity density of the positive electrode layer at from 2.5 to 4.3 V at 25° C. was 153 mAh/g, and the capacity retention after 30 times of charge and discharge cycle was 99.3%.

Further, the heat generation starting temperature was measured by heating the battery at a rate of 5° C./min by using a scanning differential calorimeter and as a result, the heat generation starting temperature in the heat generation curve of the 4.3 V charged product was 165° C.

Example 10

Example of the Invention

To an aqueous solution having 1.94 g of magnesium carbonate, 20.97 g of an aluminum maleate aqueous solution having an Al content of 2.65% and 7.21 g of citric acid monohydrate mixed with 29.88 g of water, 198.21 g of cobalt oxyhydroxide having a cobalt content of 60.0% and having an average particle size of 13 μm was added and mixed. The obtained mixture was dried in a constant temperature oven at 80° C. and then mixed with 76.43 g of lithium carbonate having a lithium content of 18.7% in a mortar, and the mixture was fired in an oxygen-containing atmosphere at 990° C. for 14 hours to obtain a fired product having a composition of $Li_{1.00}Co_{0.98}Mg_{0.01}Al_{0.01}O_2$.

The above fired product was crushed and the particle size distribution of the obtained lithium-containing composite oxide powder was measured in a water solvent by means of a laser scattering type particle size distribution measuring apparatus. As a result, the average particle size D50 was 13.0 μm, D10 was 5.9 μm, and D90 was 18.2 μm, and a substantially spherical lithium-containing composite oxide powder having a specific surface area of 0.30 m²/g as obtained by means of BET method, was obtained.

To 200 g of the above lithium-containing composite oxide, an aqueous solution having a pH of 4.0, obtained by dissolving 1.94 g of magnesium carbonate and 0.87 g of citric acid monohydrate in 46.48 g of water, adding 1.22 g of a titanium lactate aqueous solution having a Ti content of 8.1%, and further adding 1.31 g of a zirconium ammonium carbonate aqueous solution having a Zr content of 14.5%, was added, and dried at 120° C. for 4 hours with stirring and mixing. The obtained powder was fired in an oxygen-containing atmosphere at 500° C. for 12 hours to obtain a substantially spherical lithium-containing composite oxide powder having an average particle size of 13.1 μm, D10 of 6.2 μm, D90 of 18.1 μm and a specific surface area of 0.40 m²/g. The obtained composition was
$Li_{0.997}Co_{0.977}Mg_{0.011}Al_{0.01}Zr_{0.001}Ti_{0.001}O_2$.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction using CuKα ray, the half value width of the diffraction peak of (110) plane at 2θ=66.5±1° was 0.113°. The press density of this powder was 3.01 g/cm³.

The cross section of the obtained lithium-containing composite oxide powder was embedded in a resin, and the cross section of the particles polished with fine cerium oxide particles was subjected to Zr and Ti mapping by EPMA and as a result, Zr and Ti elements were detected in a larger amount on the particle outer surface than the particle interior. The total amount of Zr and Ti contained in the lithium-containing composite oxide was 9.8 mol % of all the M elements.

Electrodes and batteries were prepared and evaluated in the same manner as in Example 1 except that the positive electrode sheet was prepared by using the above lithium-containing composite oxide.

As a result, the initial weight capacity density of the positive electrode layer at from 2.5 to 4.3 V at 25° C. was 151 mAh/g, and the capacity retention after 30 times of charge and discharge cycle was 98.4%.

Further, the heat generation starting temperature was measured by heating the battery at a rate of 5° C./min by using a scanning differential calorimeter and as a result, the heat generation starting temperature in the heat generation curve of the 4.3 V charged product was 171° C.

INDUSTRIAL APPLICABILITY

According to the present invention, a positive electrode for a lithium secondary battery which has a large volume capacity density, high safety and excellent durability for charge and discharge cycles and which further has excellent low temperature characteristics, and a lithium secondary battery using the positive electrode are provided. Further, a lithium-containing composite oxide as a material of the above positive electrode for a lithium secondary battery is obtained by the production process of the present invention. They are useful in the field of lithium secondary batteries and are very highly industrially applicable in this field.

The entire disclosure of Japanese Patent Application No. 2005-319899 filed on Nov. 2, 2005 including specification, claims, drawings and summary is incorporated herein by reference in its entirety.

What is claimed is:

1. A process for producing a lithium-containing composite oxide represented by the formula $Li_pN_xM_yO_zF_a$, where
   N is at least one element selected from the group consisting of Co, Mn and Ni,
   M is at least one element selected from the group consisting of Al, alkaline earth metal elements and transition metal elements other than Co, Mn and Ni,
   $0.9 \leq p \leq 1.2$, $0.95 \leq x < 2.00$, $0 < y \leq 0.05$, $1.9 \leq z \leq 4.2$ and $0 \leq a \leq 0.05$, the process comprising
   a step 1 of mixing a lithium source, an N element source, an M element source containing at least Al, and if necessary, a fluorine source, and firing the mixture in an oxygen-containing atmosphere at from 700 to 1,100° C. to obtain a fired powder; and
   a step 2 of mixing the fired powder obtained in step 1, an M element salt aqueous solution containing at least Zr and/or Ti, and if necessary, a fluorine source, and firing the mixture in an oxygen-containing atmosphere at from 300 to 1,100° C. to produce the lithium-containing composite oxide, wherein
   the amount of Zr and/or Ti contained in the lithium-containing composite oxide powder obtained in step 2 is from 0.1 to 30 weight % based on the M elements.

2. The process according to claim 1, wherein in the above step 1, the M element source is an M element source in the form of an aqueous solution of an M element-containing carboxylate containing at least Al, and the M element-containing carboxylate is a carboxylate having at least two carboxyl groups or having at least two carboxyl group(s), hydroxyl group(s) or carbonyl group(s) in total.

3. The process according to claim 2, wherein the M element-containing carboxylate is a salt of at least one acid selected from the group consisting of citric acid, maleic acid, lactic acid and tartaric acid.

4. The process according to claim 2, wherein the M element-containing carboxylate aqueous solution has a pH of from 2 to 12.

5. The process according to claim 1, wherein the N element source and the M element source in the above step 1 are an N-M element coprecipitate precipitated by adding a pH adjustor and an alkali to an aqueous solution having an M element salt containing at least Al and an N element salt dissolved therein.

6. The process according to claim 1, wherein the M element source in step 1 contains at least Al and Mg.

7. The process according to claim 1, wherein
   the lithium-containing composite oxide powder obtained in step 2 comprises particles each having a particle surface and a particle center; and
   the Zr and/or Ti concentration in the vicinity of the particle surface is higher than the Zr and/or Ti concentration in the vicinity of the particle center.

8. The process according to claim 1, wherein in step 2 the M element salt aqueous solution is an aqueous solution containing zirconium ammonium carbonate and/or a zirconium ammonium halide.

9. The process according to claim 1, wherein in step 2 the M element salt aqueous solution is an aqueous solution containing titanium lactate.

10. The process according to claim 1, wherein in step 2 the M element salt aqueous solution further contains magnesium.

11. The process according to claim 1, wherein the N element source is at least one member selected from the group consisting of a nickel salt, a cobalt salt, a nickel-cobalt coprecipitate and a nickel-cobalt-manganese coprecipitate.

12. The process according to claim 1, wherein the N element source is at least one member selected from the group consisting of cobalt hydroxide, cobalt oxyhydroxide, tricobalt tetroxide and cobalt carbonate.

13. The process according to claim 1, wherein the M element contains Al, Zr and/or Ti, and at least one element selected from the group consisting of Hf, Nb, Ta, Mg, Sn and Zn.

14. The process according to claim 1, wherein the M element contains Al, and Zr and/or Ti, in an Al/(Zr and/or Ti) atomic ratio of from 1/2 to 40/1.

* * * * *